Figure 1:
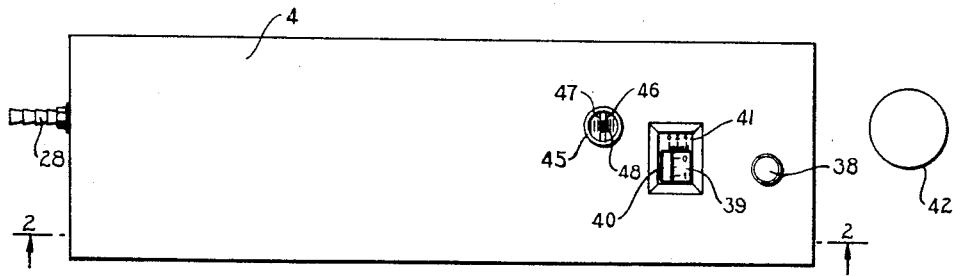

June 9, 1942.  R. T. HURLEY  2,285,515
LIGHT DIVIDING APPARATUS
Original Filed Oct. 21, 1937

INVENTOR.
Roy T. Hurley
BY
F. Bascom Smith
ATTORNEY.

Patented June 9, 1942

2,285,515

UNITED STATES PATENT OFFICE 2,285,515

LIGHT DIVIDING APPARATUS

Roy T. Hurley, Dobbs Ferry, N. Y., assignor to Bendix Aviation Corporation, South Bend, Ind., a corporation of Delaware Original application October 21, 1937, Serial No. 170,155. Divided and this application October 9, 1939, Serial No. 298,562

2 Claims. (Cl. 88—1)

This invention relates to light control apparatus, and more particularly to means for dividing a beam of light into a plurality of separate rays or beams.

This application is a division of my copending application, Serial No. 170,155, filed October 21, 1937, for Pressure measuring method and means.

It is an object of this invention to provide novel light dividing means comprising only a plate and a mirrored surface.

Another object is to provide novel means adapted to divide a beam of light into rays and to direct the divided rays of light over predetermined paths and to thereafter recombine said rays and direct the recombined beam in a predetermined direction.

A further object of the invention is to provide novel light dividing means wherein the divided beams are caused to pass through equal lengths of the medium comprising said dividing means.

Still another object is to provide novel light dividing and directing means and apparatus operable in combination therewith for increasing the length of the path of one of the divided beams.

The above and further objects and novel features of the invention will more fully appear from the following detailed description when the same is read in connection with the accompanying drawing. It is to be expressly understood, however, that the drawing is for the purpose of illustration only and is not designed as a definition of the limits of the invention, reference being primarily had for this latter purpose to the appended claims.

Figure 2:
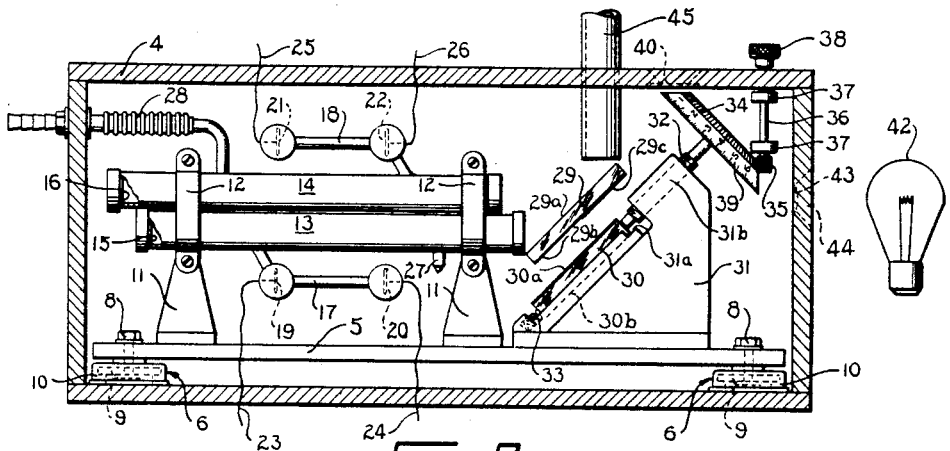
Figure 3:
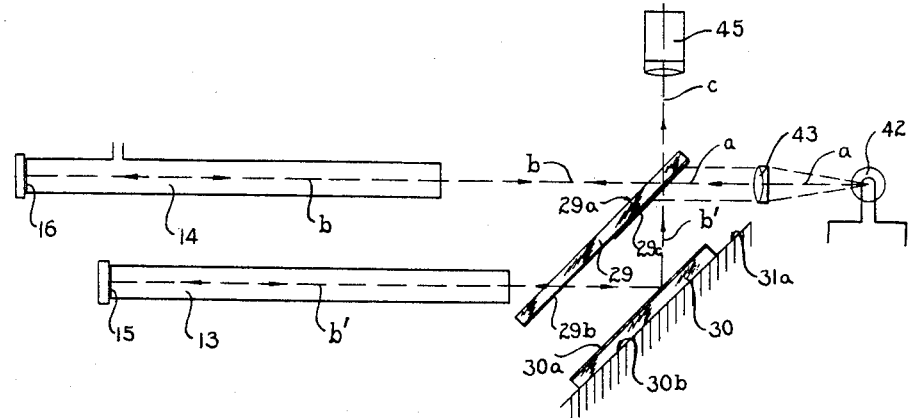

In the drawing, wherein like reference characters refer to like parts throughout the several views, Fig. 1 is a top plan view of the apparatus embodying the present invention;

Fig. 2 is a section taken along line 2—2 of Fig. 1 and illustrating the internal structure of said apparatus; and, Fig. 3 is a diagrammatic sketch, exaggerated in part, of the above device, illustrating the operation of the light dividing means of the above apparatus.

In the illustrated embodiment, the present invention is shown in combination with an interferometric device for measuring pressures, although it is to be expressly understood that said invention can be utilized in other light responsive apparatus. The interferometer comprises a casing 4, and a base plate 5 mounted within said casing by means of vibration absorbing supports 6. As shown, said supports comprise bolts 8, 8 which are fixed at one end to plate 5 and at the other end to rubber washers 9, 9, said rubber washers being mounted by suitable brackets 10, 10 on casing 4. As a result, washers 9, 9 absorb any vibrations imparted to said casing and reduce, if they do not wholly eliminate, any effect of said vibration upon base plate 5 and the apparatus mounted thereon.

Integral with said base plate or otherwise suitably affixed thereto are supports 11, 11. Mounted on said supports and held in place by brackets 12, 12 are two chambers 13 and 14 of equal length and of similar construction. Both of said chambers are air-tight and insulated from the remaining apparatus within casing 4. The purpose of chambers 13 and 14 is to provide paths for beams of light, emanating from a single source, said beams being reflected through said chambers back to their plane of separation, and there caused to be reunited in such a way as to provide, by means of their interference or reinforcement, a means of comparing the optical lengths of the two chambers (geometric length being the same). Each part of the split beam passes twice through its appropriate chambers 13 or 14, being reflected from a mirror 15 or 16, at the far end, and contains the same amount of glass or other medium of high index and, except for one variable air distance, the same amount of external air path. Any change in optical paths introduced by a change in the index of refraction of the air contained in either of the chambers may be compensated by a change in the geometrical length of the variable air path.

For the purpose of comparison and as a test of the instrument setting, means are provided, in the form of transparent glass tubes 17 and 18 attached and connected to said chambers, for measuring the degree of vacuum in each of said chambers. The bulbous or spherical ends of each of said tubes contain electrical terminals 19, 20, 21, 22 connected to leads 23, 24, 25, and 26. Said leads are connected to a source of high potential (not shown) and the appearance of the luminous discharge which results when said potential is applied across the terminals 19, 20 and 21, 22, respectively, is a measure of the vacuum in the chambers 13 and 14, according to rules well-known and catalogued. The resulting luminous discharge is sufficiently uniform under easily controlled conditions to be acceptable as an accurate indication of the degree of vacuum.

The lower of said chambers, namely chamber 13, in the embodiment illustrated, is evacuated so as to provide a medium of substantially zero density for the passage of light therethrough, and thereafter opening 27 in chamber 13 is sealed. The reason for using an evacuated chamber as a standard is that a vacuum is more easily reproducible and measurable than any standard pressure and is not affected by temperature and, in addition, any barometric altimeter based on a vacuum as a standard is subject to less error. Chamber 14 is at all times open to the atmosphere and, to this end, a flexible open-ended tube 28 is connected to chamber 14, the outer end of said tube passing through the wall of casing 4 at some static point where the pressure is to be determined. If desired, a drying chamber (not shown) may be incorporated at some suitable point in tube 28 to dry the small amount of air which will flow into and out of chamber 14 with fluctuations of pressure. The use of such a drying chamber does not vary the pressure in chamber 14, since the pressure of the dry air within the tubing 28 is equal to the combined pressure of the dry air and water vapor of the atmosphere.

In the operation of apparatus which employs the light interference principle, it is necessary that a ray of light be separated into two beams of substantially equal intensities and that each of said beams be directed over separate paths and then recombined into a single ray which is directed into a viewing instrument. Novel means for the separation of said beams are provided in the present invention, said means comprising two plane surfaced glass plates 29 and 30. The upper and lower surfaces 29a and 29b, respectively, of glass plate 29 are parallel to the upper surface 30a of plate 30. The right-hand portion 29c (as viewed in Fig. 3) of surface 29b is "half-silvered" so that a portion of a horizontal ray of light falling upon this surface will pass directly through the plate into the chamber 14 and the remaining portion of the ray will be reflected by the "half-silvered" surface onto the plate 30. Surface 30a of plate 30 upon which the reflected light beam falls is completely silvered.

In order to adjust the distance between plates 29 and 30 and yet maintain the existing parallelism between the surfaces 29a, 29b, and 30a, the lower surface 30b of plate 30 is ground so that its plane is oblique to the plane of surface 30a. A supporting surface 31a upon which the plate 30 is slidably mounted is provided by bracket 31, said bracket being rigidly mounted upon or integral with base plate 5. Any sliding movement of plate 30 in the direction of inclination increases or decreases the distance between plates 29 and 30, and the path of light passing from 29c to 30a. However, the parallelism established between the surfaces 29a and 29b of plate 29 and surface 30a of plate 30 remains unchanged by said motion.

To control the sliding movement of plate 30 and thereby control the distance between the surfaces 29b and 30a, an accurately threaded, micrometer screw 32 is adapted to screw into the internally threaded bore in projecting portion 31b of supporting bracket 31 and to have one end thereof bearing upon an edge of plate 30. The opposite edge of said plate is acted upon by compressed coil spring 33, thereby maintaining the contact between the end of shaft 32 and the plate. Suitably fixed to or integral with the other end of said shaft is bevel gear 34. Rotation of gear 34 moves shaft 32 axially and causes plate 30 to slide along the bracket surface 31a, altering the distance between surfaces. It will be understood that any other suitable means, such as a parallel motion mechanism, may be used to adjust the distance between said surfaces.

Controlling the rotation of bevel gear 34 is pinion 35 which coacts therewith and which is fixed by any suitable means to shaft 36. Said shaft is mounted in bearings 37, 37, and extends outside of casing 4. Knob 38 is mounted on the extending portion of said shaft so that rotation of knob 38 will control the displacement of plate 30. The mechanism from 35 to knob 38 is arranged to act as a shock absorber by the introduction of soft rubber at suitable points, the purpose being to protect the sensitive mechanism of the micrometer screw from injury arising from accidental shock communicated through the external protruding knob.

To indicate the degree of rotation of shaft 32 and the consequent displacement of plate 30, a suitable scale 39 is calibrated upon the drum of bevel gear 34 and may be viewed through window 40 in casing 4. Said scale gives a reading up to a whole revolution of said gear. A second scale 41 adapted to give readings of the number of revolutions of said gear is provided on the surface of a part of window 40. The scales, when read together, give extremely accurate readings of the adjustment of the aforementioned lens distance.

Any suitable source of light can be utilized to provide the ray of light which is to be divided into beams. As shown, said source is an incandescent lamp 42. The light emitted by said lamp enters casing 4 through a lens 43 in an opening 44 in said casing. Said lens is preferably a collimator lens which produces parallel rays of light after the passage of said light through said lens.

The reflected and recombined beams are viewed by means of an optical arrangement commonly attributed to Polfrich and consisting of a lens whose focal length is nearly the distance from it to the virtual images of the mirrors 15 and 16 at the far ends of the comparison chambers and two or more other lenses arranged as a telescope 45 focused nearly on infinity. By this arrangement, the two mirrors above mentioned will be on focus at the same time as the fringes which will appear when the optical paths of the respective beams are substantially equal, and hence the cross wires 46 and 47 may be engraved in one of these mirrors or placed immediately in front of its surface and attached to it so that any one of said fringes may be centered between said cross wires. As a result, accidental movement of the telescope does not vitiate the relative positions of fringes and cross wires.

In operation, the ray of light a emitted by the source 42 passes through collimator lens 43, into casing 4, and then is partially transmitted through, and partially reflected from, the half-silvered surface 29c of plate 29. The undeviated portion b of ray a passes directly through a single thickness of plate 29 into chamber 14 from which it is reflected back along the path b to the half-silvered surface 29c and then, due to the inclination of plate 29, is reflected at substantially right angles to the original path and forms a part of combined ray c passing into the viewing instrument 45.

The reflected beam b' passes at right angles to the path a and then upon the mirrored surface 30a of plate 30 from which surface it is reflected through a thickness of plate 29 into chamber 13. From chamber 13 the ray is reflected back along path b' and is reflected by the surface 30a of the plate 30 to the half-silvered surface 29b of the plate 29 through which a part of it passes and combines with the reflected portion of beam b to produce beam c.

There is thus provided novel light dividing means operable in combination with apparatus for measuring pressures and altitudes. The light dividing means comprise a novel arrangement of a transparent plate having a semi-mirrored surface, and a second plate having a totally mirrored surface. As a result of the novel arrangement of said plates, a beam of light is divided into two beams which are directed in substantially parallel paths. The divided beams pass through the same transparent plate, and no other medium except air is interposed in the path of divided beams by the novel dividing means. Accordingly, it is only necessary to make the surfaces of a single plate parallel in the present invention in order to have the divided beams pass through equal lengths of the same medium.

Devices heretofore employed for dividing a beam of light have required at least two plates through which one or both of the divided beams had to pass in order for said beams to travel over equal lengths of the same medium. As a result, it was necessary to arrange a plurality of parallel-surfaced plates in parallel relationship to each other, and also to have the plates of equal thickness. According to the present invention, the same result is produced by a single plate having parallel surfaces, and a light reflecting member having the light reflecting surface thereof parallel to said plate. Thus, the structure is simplified and the parts thereof may be arranged for greater accuracy with less expenditure of time and effort.

Although only a single embodiment of the invention has been illustrated and described in detail, it is to be expressly understood that the same is not limited thereto, but that various changes may be made therein without departing from the spirit and scope of the invention. For a definition of the limits of the invention, reference will be had primarily to the appended claims.

What is claimed is:

1. In apparatus of the class described, means for dividing a beam of light and directing the divided beams over substantially parallel paths, said means comprising a light transmitting member having parallel surfaces, one of said surfaces having a portion thereof partly mirrored, and a light reflecting member, said light reflecting member having the reflecting surface thereof adjacent and parallel to the partly mirrored surface of said light transmitting member, said members being separated a sufficient distance to cause the light beam portions that are reflected from said partly mirrored surface on said light reflecting member to be directed by the latter through the unmirrored portion of the light transmitting member.

2. In apparatus for dividing a beam of light, a transparent plate having parallel surfaces, said plate having a portion of one of said surfaces partially mirrored, and a light-reflecting member having the light transmitting surface thereof parallel to and adjacent the partially mirrored surface of said plate, said partially mirrored surface being adapted to divide a beam of light directed thereon into two rays so that one of said rays is directed away from and one toward said reflecting surface, said plate and member being so arranged relative to each other that the latter ray is reflected by said reflecting surface parallel to the former ray and is caused to pass through the thickness of the unmirrored portion of said plate.

ROY T. HURLEY.